United States Patent
Lee

(10) Patent No.: US 10,707,708 B2
(45) Date of Patent: Jul. 7, 2020

(54) ROTOR CORE, ROTOR, AND MOTOR INCLUDING SAME

(71) Applicant: LG Innotek Co., Ltd., Seoul (KR)

(72) Inventor: Myoung Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 79 days.

(21) Appl. No.: 15/770,055

(22) PCT Filed: Oct. 18, 2016

(86) PCT No.: PCT/KR2016/011692
§ 371 (c)(1),
(2) Date: Apr. 20, 2018

(87) PCT Pub. No.: WO2017/069488
PCT Pub. Date: Apr. 27, 2017

(65) Prior Publication Data
US 2018/0323667 A1 Nov. 8, 2018

(30) Foreign Application Priority Data
Oct. 20, 2015 (KR) ........................ 10-2015-0146234

(51) Int. Cl.
| | |
|---|---|
| *H02K 1/27* | (2006.01) |
| *H02K 1/24* | (2006.01) |
| *H02K 1/17* | (2006.01) |
| *H02K 1/18* | (2006.01) |
| *H02K 3/34* | (2006.01) |
| *H02K 15/00* | (2006.01) |
| *H02K 15/095* | (2006.01) |
| *H02K 15/03* | (2006.01) |

(52) U.S. Cl.
CPC ............ *H02K 1/2753* (2013.01); *H02K 1/17* (2013.01); *H02K 1/185* (2013.01); *H02K 1/24* (2013.01); *H02K 1/27* (2013.01); *H02K 1/276* (2013.01); *H02K 1/278* (2013.01); *H02K 3/345* (2013.01); *H02K 15/0018* (2013.01); *H02K 15/095* (2013.01); *H02K 15/03* (2013.01)

(58) Field of Classification Search
CPC .. H02K 1/00; H02K 1/17; H02K 1/14; H02K 1/148; H02K 1/18; H02K 1/185; H02K 1/24; H02K 1/27; H02K 1/275; H02K 1/2753; H02K 1/278; H02K 15/00; H02K 15/02; H02K 15/022; H02K 15/03; H02K 15/09; H02K 15/095; H02K 29/03
See application file for complete search history.

(56) References Cited

FOREIGN PATENT DOCUMENTS

| | | |
|---|---|---|
| JP | 62-293946 A | 12/1987 |
| JP | 2003-134772 A | 5/2003 |

(Continued)

OTHER PUBLICATIONS

International Search Report in International Application No. PCT/KR2016/011692, filed Oct. 18, 2016.
(Continued)

*Primary Examiner* — Tran N Nguyen
(74) *Attorney, Agent, or Firm* — Saliwanchik, Lloyd & Eisenschenk

(57) ABSTRACT

The present invention provides a rotor core, which comprises a plurality of grooves formed at the same interval along the circumferential direction, wherein the number of the grooves is an integer multiple of the least common multiple of commonly used pole number.

9 Claims, 5 Drawing Sheets

(56) References Cited

FOREIGN PATENT DOCUMENTS

| JP | 2005-020887 A | 1/2005 |
| JP | 2015-042038 A | 3/2015 |
| JP | 2015-109743 A | 6/2015 |
| KR | 10-2015-0053719 A | 5/2015 |

OTHER PUBLICATIONS

Office Action dated Aug. 15, 2019 in Chinese Application No. 201680061762.X.

US 10,707,708 B2

ROTOR CORE, ROTOR, AND MOTOR INCLUDING SAME

CROSS-REFERENCE TO RELATED APPLICATIONS

This application is the U.S. national stage application of International Patent Application No. PCT/KR2016/011692, filed Oct. 18, 2016, which claims priority to Korean Application No. 10-2015-0146234, filed Oct. 20, 2015, the disclosures of each of which are incorporated herein by reference in their entirety.

TECHNICAL FIELD

Embodiments relate to a rotor core, a rotor, and a motor including the same.

BACKGROUND ART

Generally, in a motor, a rotor is rotated by electromagnetic interaction between the rotor and a stator. In this case, a rotational shaft inserted into the rotor is also rotated to generate a rotational driving force.

Here, the rotor may be classified into a surface permanent magnet (SPM) type rotor and an interior permanent magnet (IPM) type rotor according to a coupling structure of a magnet provided at a rotor core.

Here, the interior permanent magnet type rotor has a configuration in which a pocket is provided in the rotor core and the magnet is inserted into the pocket. On the other hand, the surface permanent magnet type rotor has a configuration in which the magnet is attached to an outer circumferential surface of the rotor core.

Meanwhile, in the surface permanent magnet type rotor, a guide protrusion may be formed on the outer circumferential surface of the rotor core in order to align a position of the magnet and to enhance a coupling ability between the rotor core and the magnet. The guide protrusion is elongated in an axial direction of the rotor to form a slot into which the magnet is inserted from the outer circumferential surface of the rotor core.

However, the above-described configuration of the rotor core has a problem in that a design is complicated and manufacturing cost is increased. This is because the number of guide protrusions is varied according to the number of poles of the motor, and thus a shape of the rotor core is changed. That is, there is a problem in that the rotor cores corresponding to the number of poles of the motor should be separately manufactured.

DISCLOSURE

Technical Problem

The present invention is directed to providing a rotor core capable of being commonly used for various motors having different numbers of poles, a rotor and a motor including the same.

The problems to be solved by the embodiments are not limited to the above-described problems, and other problems which are not described herein may be understood by those skilled in the art from the following description.

Technical Solution

One aspect of the present invention provides a rotor core including a plurality of grooves formed at regular intervals in a circumferential direction, wherein the number of the grooves is an integer multiple of the least common multiple of numbers of common poles.

The rotor core may include a plurality of rotor plates in which the grooves are formed and which are stacked on each other.

Another aspect of the present invention provides a rotor including a rotor core having a plurality of grooves formed at regular intervals in a circumferential direction, wherein the number of the grooves is an integer multiple of the least common multiple of numbers of common poles, and a plurality of magnets separated by reference grooves among the plurality of grooves and disposed on an outer circumferential surface of the rotor core.

The number of the reference grooves may be the number of the magnets, and the plurality of reference grooves may be disposed at regular intervals in the circumferential direction.

The rotor may further include a protector configured to surround the magnets and coupled to the reference groove.

The protector may include a rim in contact with an outer surface of the magnet and arms formed on the rim to protrude inward and positioned between the adjacent magnets to be coupled to the reference grooves.

The arm may be in contact with a side surface of the magnet.

Among the grooves, the groove disposed between the reference grooves may an adhesive receiving groove.

Still another aspect of the present invention provides a motor including a rotor core including a plurality of grooves formed at regular intervals in a circumferential direction, the number of the grooves being an integer multiple of the least common multiple of target numbers of common poles; a rotor including magnets separated by reference grooves among the plurality of grooves and coupled to an outer circumferential surface of the rotor core; a rotational shaft coupled to the rotor core; and a stator disposed at an outer side of the rotor core.

The number of the references grooves may be the number of the magnets, and the plurality of reference grooves may be disposed at regular intervals in a circumferential direction.

Advantageous Effects

According to embodiments, a rotor core is configured so that the rotor core can be commonly used in various motors having different numbers of poles by forming grooves as many as an integer multiple of the least common multiple of numbers of common poles on an outer circumferential surface thereof, thereby providing a favorable effect of greatly reducing the number of manufacturing processes and manufacturing cost.

That is, the present invention provides an advantageous effect that a rotor core configuration that can be commonly used in various motors having different numbers of poles, such as 6 poles, 8 poles, 10 poles, etc., is proposed so that a rotor core which is applicable to various motors having different numbers of poles can be manufactured using one mold.

MODES OF THE INVENTION

Hereinafter, exemplary embodiments of the present invention will be described in detail with reference to the accompanying drawings. Objects, specific advantages, and novel features of the present invention will become more apparent from the following detailed description and the exemplary embodiments related to the accompanying drawings. In addition, terms and words used in the specification and claims should not be construed to be limited to ordinary or dictionary meanings and should be construed as the meaning and concept consistent with the technical idea of the present invention in view of the fact that an inventor should appropriately define the concept of the terms in order to describe own invention in the best way. In addition, in the following description, a detailed description of the related arts which may unnecessarily obscure the gist of the present invention will be omitted.

Figure 1:
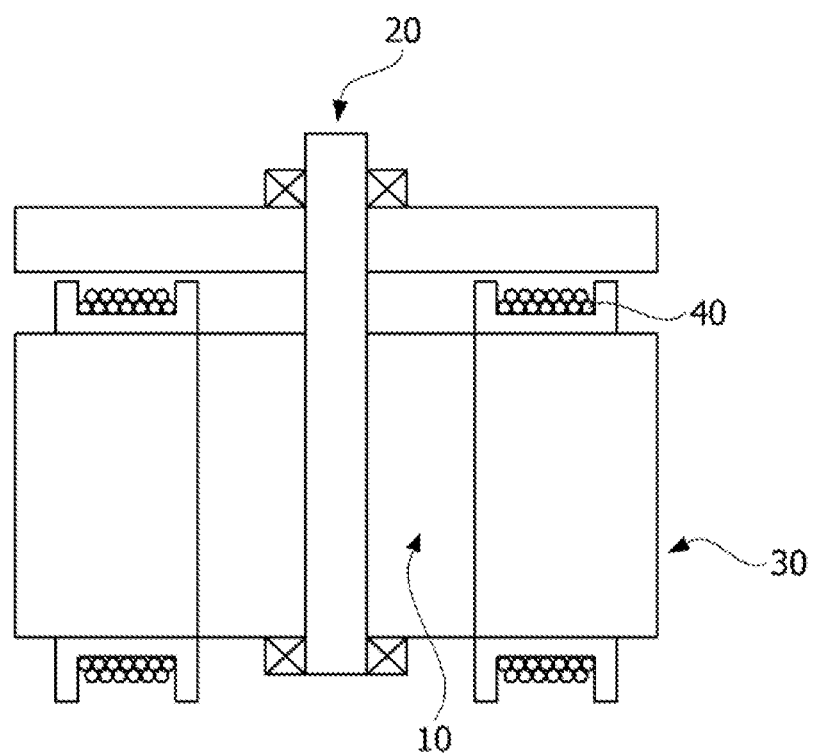
FIG. 1 is a view illustrating a motor according to one embodiment of the present invention.

FIG. 1 is a view illustrating a motor according to one embodiment of the present invention.

Referring to FIG. 1, the motor according to one embodiment may include a rotor 10, a rotational shaft 20, and a stator 30.

The stator 30 is coupled to a housing, and the rotor 10 is disposed inside the stator 30. The rotational shaft 20 may be coupled to a central portion of the rotor 10. A coil 40 is wound around the stator 30 so that the stator has a magnetic pole, and the rotor 10 is rotated by a magnetic field formed by winding the coil 40, and the rotational shaft 20 is also rotated.

First, the stator 30 may be formed to include a plurality of stator cores. For example, the stator core may be constructed by stacking a plurality of steel plates, each of which includes an annular yoke section and stator teeth sections which are disposed in a circumferential direction and protrude inward in a radial direction from the yoke section at equiangular intervals. The coil 40 for forming a rotating magnetic field may be wound around the stator teeth. In this case, the coil 40 may be electrically insulated by an insulator.

The rotor 10 is disposed to be rotatable with respect to the stator 30. The rotor 10 may be rotated by electromagnetic interaction between the rotor and the stator 30. The rotational shaft 20 may be coupled to the central portion of the rotor 10. Therefore, when the rotor 10 is rotated, the rotational shaft 20 is rotated together with the rotor. In this case, the rotational shaft 20 may be supported by a bearing.

Figure 2:
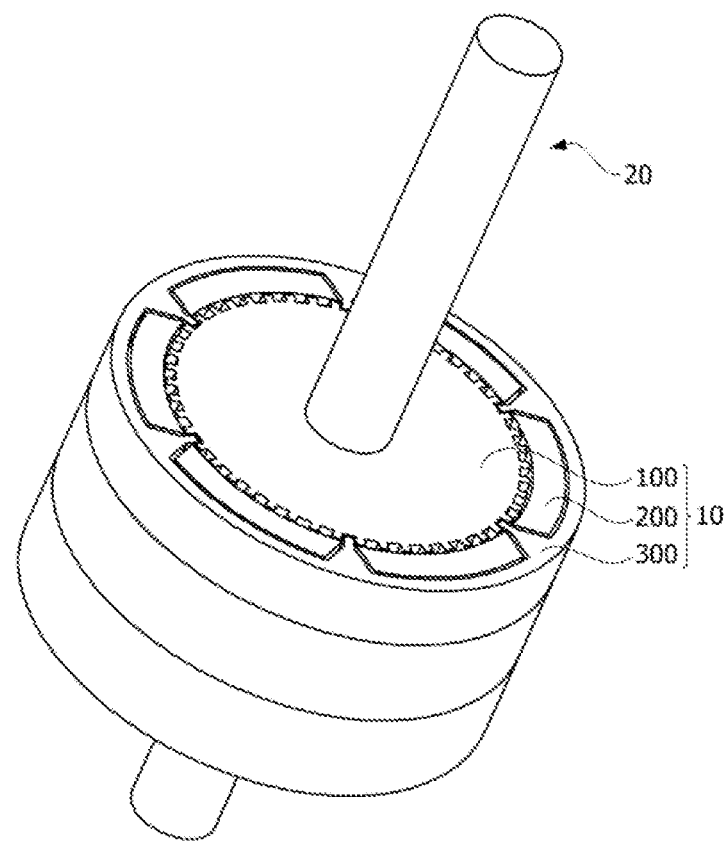
FIG. 2 is a view illustrating a rotor according to one embodiment of the present invention.

FIG. 2 is a view illustrating the rotor according to one exemplary embodiment of the present invention. Referring to FIG. 2, the rotor 10 according to one exemplary embodiment of the present invention may include a rotor core 100, magnets 200, and a protector 300.

The magnets 200 are coupled to the rotor core 100. In this case, the rotor 10 is configured to enable the magnets 200 to be coupled to an outer circumferential surface of the rotor core 100. The magnets 200 may be attached to the rotor core at regular intervals in a circumferential direction of the rotor core 100.

The number of the magnets 200 attached to an outer side of the rotor core 100 corresponds to the number of poles of the motor. For example, when the motor has six poles, six magnets 200 may be disposed in the circumferential direction of the rotor core 100, and when the motor has eight poles, eight magnets 200 may be attached in the circumferential direction of the rotor core 100.

In this case, specific criterion is required for the rotor core 100 to dispose the magnets 200 at regular intervals. Since positions of the magnets 200 may affect whether a cogging torque of the motor is generated, it is important to attach the magnets 200 at regular intervals in the circumferential direction. Here, the cogging torque means a pulsating torque generated by a tendency in which a reluctance decreases to a minimum value in a magnetic circuit consisting of the rotor 10, the stator 30, and a gap.

Figure 3:
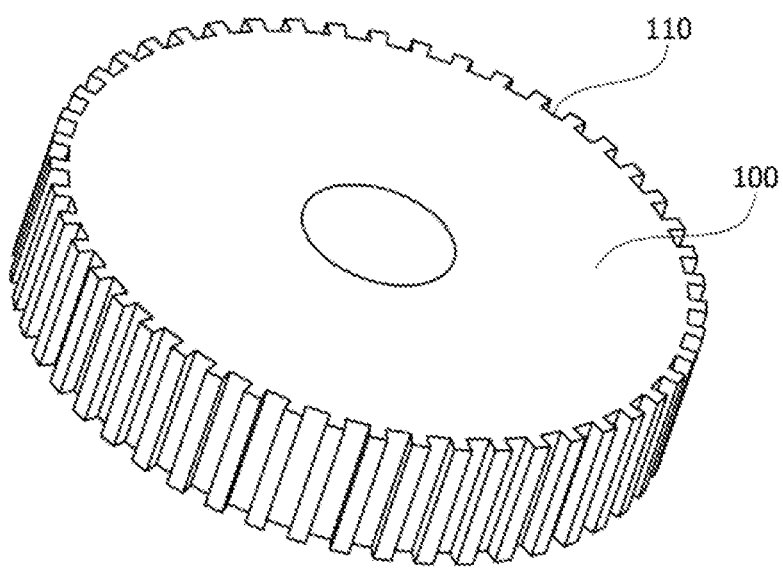
FIG. 3 is a view illustrating a rotor core shown in FIG. 2.

FIG. 3 is a view illustrating the rotor core shown in FIG. 2.

Referring to FIGS. 2 and 3, the rotor core 100 may include a plurality of grooves 110. An attachment position of the magnet 200 is determined on the basis of the grooves 110. The plurality of grooves 110 may be formed at regular intervals in the circumferential direction of the rotor core 100.

In this case, the number of the grooves 110 may be an integer multiple of the least common multiple of numbers of common poles. Here, the number of the common poles means the number of poles of the motor desired to be implemented by applying the rotor core 100 having the same configuration. As described above, the number of poles of the motor corresponds to the number of the magnets 200 attached to the rotor core 100.

Meanwhile, the rotor core 100 may be formed by stacking a plurality of rotor plates, each of which has the plurality of grooves 110a.

Figure 4:
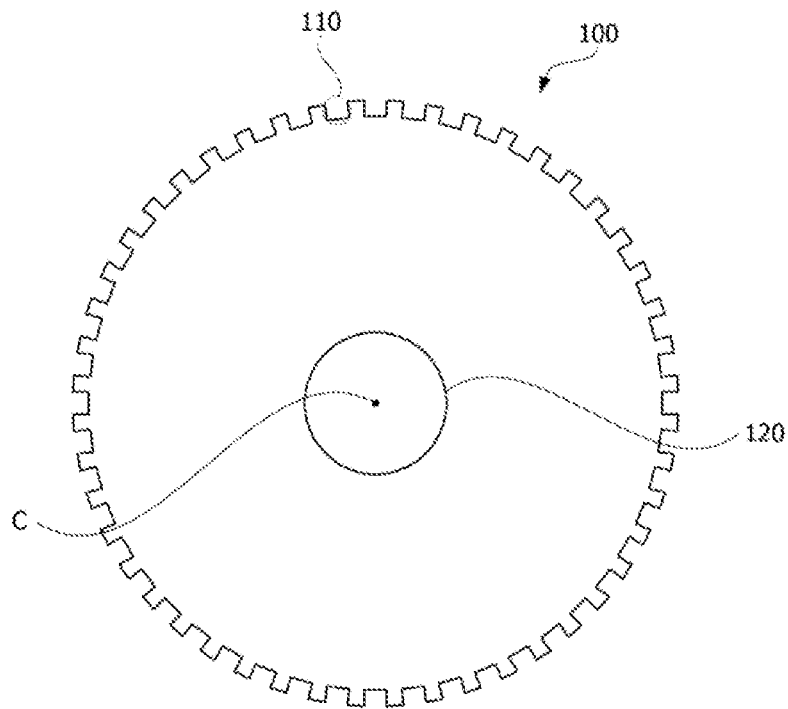
FIG. 4 is a view illustrating the rotor core which may be commonly used as a 6-pole rotor core and an 8-pole rotor core.

FIG. 4 is a view illustrating the rotor core which may be commonly used as a 6-pole rotor core and an 8-pole rotor core.

Referring to FIG. 4, as one example, the rotor core 100 configured to be commonly used as the 6-pole rotor core and the 8-pole rotor may include 48 grooves 110 formed at regular intervals in the circumferential direction.

When numbers of poles of the motors for which the rotor core is commonly used are 6 and 8, 48 grooves 110 may be formed, wherein 48 is two times 24 that is the least common multiple of 6 and 8. Regarding the number of the grooves 110, the present invention is not limited to the above, and the number of the grooves corresponding to 1, 3, or 4 or higher times the least common multiple of numbers of the common poles may be formed.

Meanwhile, although not illustrated in the drawings, as another example, the rotor core 100 configured to be commonly used as an 8-pole rotor core and a 10-pole rotor core may include 40, 80, or 120 grooves 110. When numbers of common poles are 8 and 10, the least common multiple of 8 and 10 is 40, and the grooves 110 corresponding to an integer multiple of 40, which is the least common multiple, may be formed.

In addition, although not illustrated in the drawings, as still another example, the rotor core 100 configured to be commonly used as a 6-pole rotor core, an 8-pole rotor core, and a 10-pole rotor core may include 120 or 240 grooves 110. When numbers of common poles are 6, 8, and 10, the least common multiple of 6, 8, and 10 is 120, and the grooves 110 corresponding to an integer multiple of 120, which is the least common multiple, may be formed.

It is not necessary to fabricate the rotor cores, which have different shapes according to the number of poles of the motor in which the rotor core is commonly used, by determining and forming the number of the grooves 110 serving as a reference for attaching the magnet 200 on the basis of the least common multiple of the number of poles which are commonly used.

Figure 5:
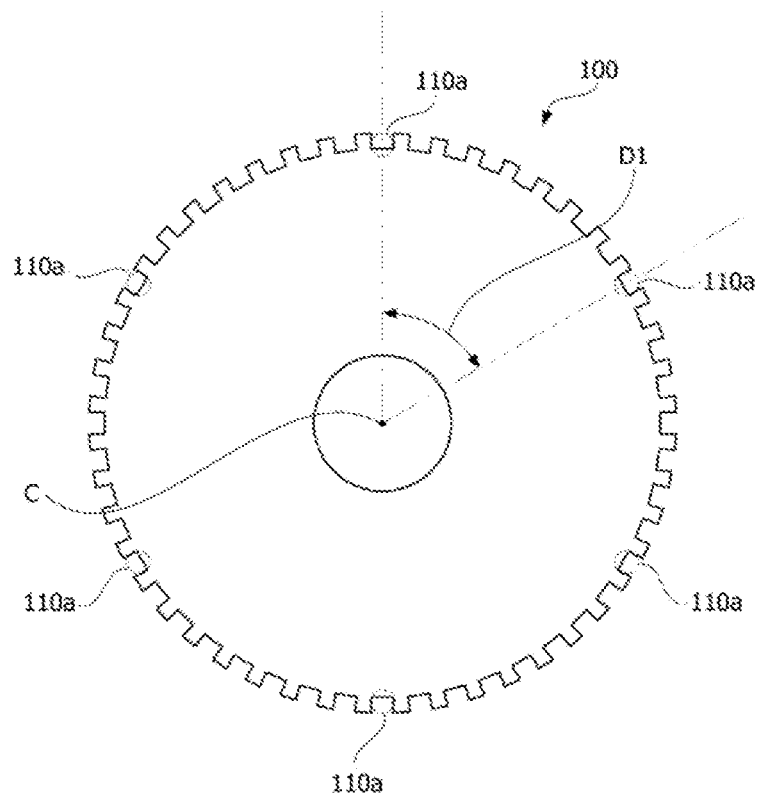
FIG. 5 is a view illustrating a reference groove of the rotor core on which six poles are implemented.

FIG. 5 is a view illustrating a reference groove of the rotor core on which six poles are implemented.

Referring to FIG. 5, reference grooves 110a may be set in the plurality of grooves 110. The reference groove 110a is the groove 110 serving as a reference for separating the magnets 200 attached to the outer circumferential surface of the rotor core 100. The plurality of reference grooves 110a may be formed and the plurality of reference grooves 110a may also be formed to be disposed at regular intervals.

Figure 6:
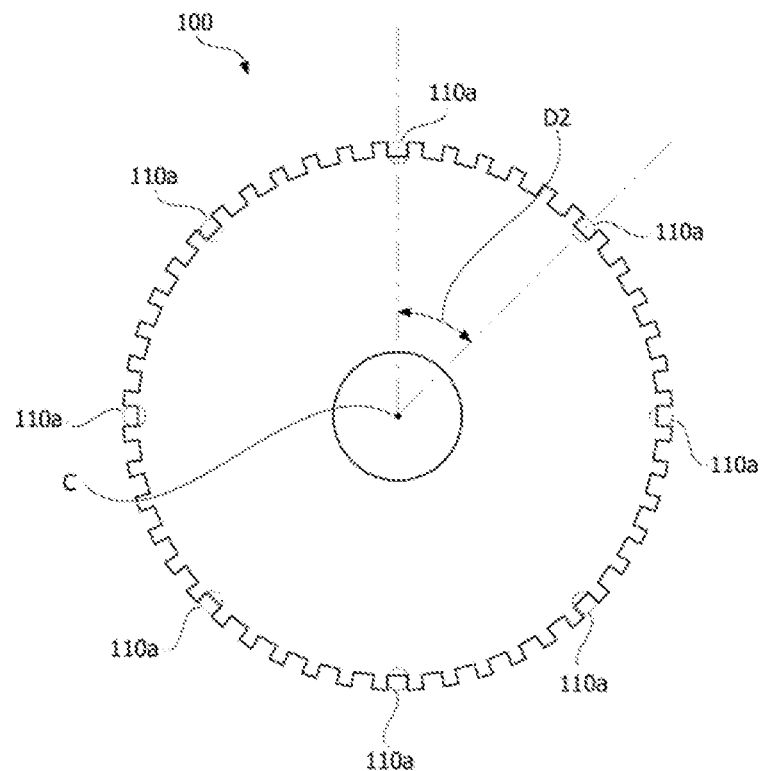
FIG. 6 is a view illustrating a reference groove of the rotor core on which eight poles are implemented.

For example, when numbers of common poles are 6 and 8, and the number of poles of the motor to be implemented is 6, six reference grooves 110a which is the same as the number of poles of the motor may be provided. That is, when the number of poles to be implemented is 6, six reference grooves 110a among 48 grooves 110 are provided, wherein 48 is two times 24 that is the least common multiple of the number of common poles, and the reference grooves 110a may be disposed to be spaced apart from each other at the same angle D1 in the circumferential direction of the rotor core 100. "C" in FIG. 5 indicates a center of the rotor core 100. FIG. 6 is a view illustrating a reference groove of the rotor core on which eight poles are implemented.

Referring to FIG. 6, when numbers of common poles are 6 and 8, and the number of poles of the motor to be implemented is 8, eight reference grooves 110a may be provided. That is, when the number of poles to be implemented is 8, eight reference grooves 110a among 48 grooves 110 are provided, wherein 48 is two times 24 that is the least common multiple of the number of common poles, and the reference grooves 110a may be disposed to be spaced apart from each other at the same angle D2 in the circumferential direction of the rotor core 100.

Figure 7:
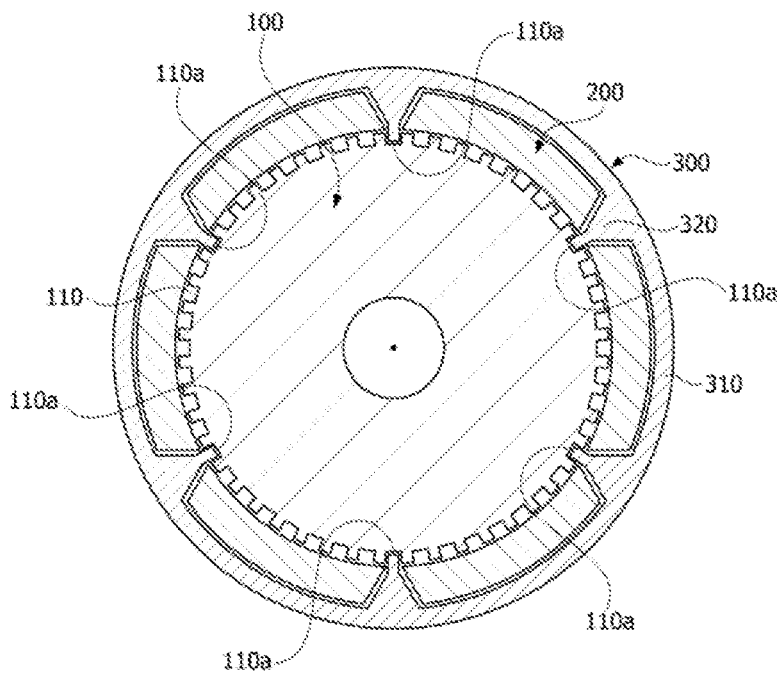
FIG. 7 is a view illustrating the rotor on which eight poles are implemented.
Figure 8:
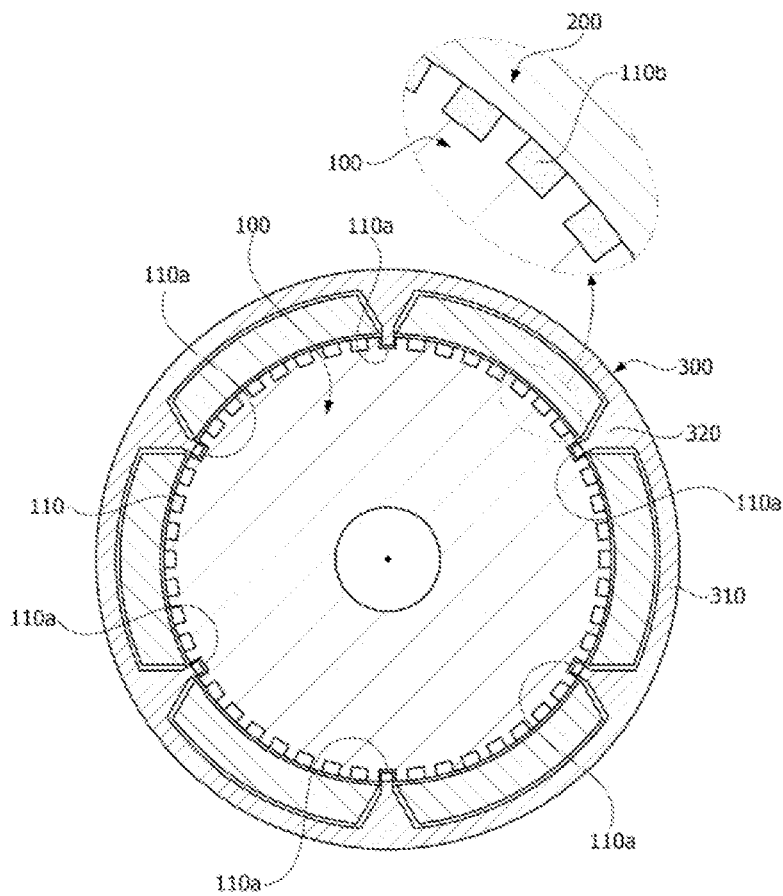
FIG. 8 is a view illustrating a state in which a groove is filled with an adhesive.

FIG. 7 is a view illustrating the rotor on which eight poles are implemented, and FIG. 8 is a view illustrating a state in which a groove is filled with an adhesive.

Referring to FIG. 7, when numbers of common poles are 6 and 8, and the number of poles of the motor to be implemented is 8, eight reference grooves 110a are provided, and eight magnets 200 may be separated by the reference grooves 100a and attached to the outer circumference surface of the rotor core 100. Five grooves 110 in contact with the magnets 200 may be positioned between the adjacent reference grooves 110.

Referring to FIG. 8, the adhesive is applied on portions between the outer circumferential surface of the rotor core 100 and the magnets 200 to attach the magnets 200 to the rotor core 100, and five grooves 110 positioned between the adjacent reference grooves 110 are filled with the applied adhesive. The grooves 110 positioned between the adjacent reference grooves 110 may be utilized as the adhesive receiving grooves 110b.

Figure 9:
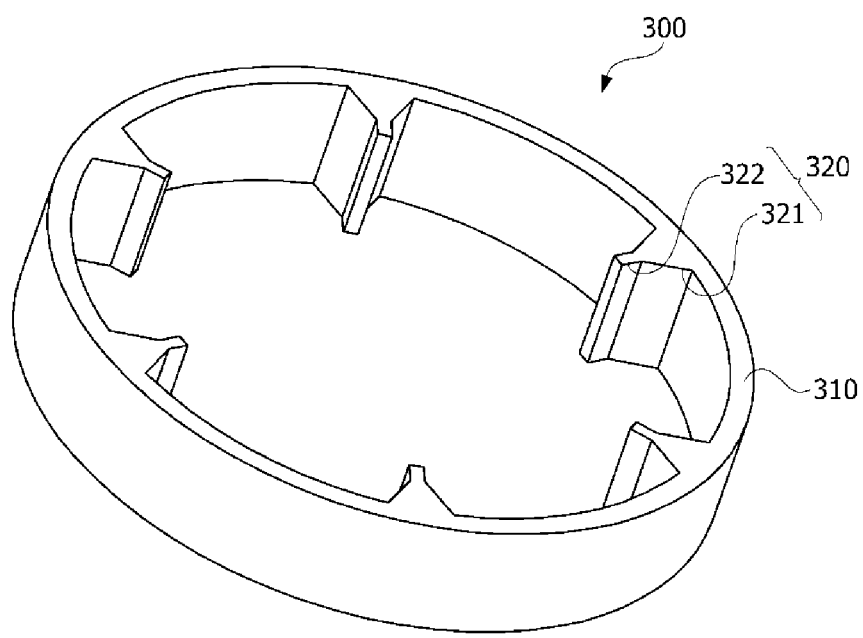
FIG. 9 is a view illustrating a protector.

FIG. 9 is a view illustrating the protector.

Referring to FIGS. 7 and 9, the protector 300 may be disposed at an outer side of the magnets 200. The protector 300 fixes the magnets 200 to prevent the magnets 200 from being detached from the rotor core 100.

The protector 300 may include an annular rim 310 and arms 320. The rim 310 may be formed in a ring shape to surround the outer side of the rotor core 100 and to be in contact with outer surfaces of the magnets 200. The arm 320 is formed on the rim 310 to protrude inward and is positioned between the adjacent magnets 200. A body 321 of the arm 320 fixes the magnet 200 in a state in which the body is in contact with a side surface of the magnet 200, and a tip portion 322 formed at an end of the body 321 is inserted into and coupled to the reference groove 110a so as to couple the protector 300 to the rotor core 100.

As described above, the rotor core, the rotor, and the motor including the same according to one exemplary embodiment of the present invention have been described in detail with reference to the accompanying drawings.

The above description is given for only examples of the technical idea of the present invention, and those skilled in the art to which the present invention pertains may variously modify, change, and substitute the present invention without departing from the essential characteristics of the present invention. Therefore, the embodiments disclosed in the present invention and the accompanying drawings are intended to describe rather than limit the technical spirit of the present invention, and the scope of the technical idea of the present invention is not limited to the embodiments and the accompanying drawings. The scope of protection of the present invention should be construed according to the appended claims, and all technical ideas within the scope of equivalents thereof should be construed as being included in the scope of the present invention.

REFERENCE NUMERALS

10: Rotor 20: Rotational shaft
30: Stator 40: Coil
100: Rotor core 110: Groove
110a: Reference groove 200: Magnet
300: Protector 310: Rim
320: Arm

The invention claimed is:

1. A rotor comprising:
a rotor core comprising a plurality of grooves formed at regular intervals in a circumferential direction, wherein the plurality of grooves comprises a plurality of reference grooves; and a number of the plurality of grooves is a least common multiple of at least two different positive integer numbers; and
a plurality of magnets separated by the plurality of reference grooves of the plurality of grooves and disposed on an outer circumferential surface of the rotor core.

2. The rotor of claim 1, wherein a number of the plurality of reference grooves is equal to a number of the magnets, and the plurality of reference grooves is disposed at regular intervals in the circumferential direction.

3. The rotor of claim 2, comprising a protector configured to surround the magnets and coupled to the reference grooves.

4. The rotor of claim 3, wherein the protector comprises a rim in contact with outer surfaces of the plurality of magnets and arms formed on the rim to protrude inward and positioned between respective adjacent magnets of the plurality of magnets, wherein the arms to be coupled to respective reference grooves of the plurality of reference grooves.

5. The rotor of claim 4, wherein each of the arms is in contact with side surfaces of the adjacent magnets.

6. The rotor of claim 2, wherein, the plurality of grooves comprises adhesive receiving grooves disposed between adjacent reference grooves.

7. A motor comprising:
a rotational shaft;
a rotor having a hole in which the rotational shaft is disposed; and
a stator disposed at an outer side of the rotor,
wherein the rotor comprises a rotor core coupled to the rotational shaft and a plurality of magnets disposed on an outer circumferential surface of the rotor core,
the rotor core comprises a plurality of grooves formed at regular intervals in a circumferential direction, the plurality of grooves comprises a plurality of reference grooves, and a number of the plurality of grooves is a least common multiple of at least two different positive integer numbers; and
the magnets of the plurality of magnets are separated by the reference grooves of the plurality of grooves, respectively.

8. The motor of claim 7, wherein a number of the plurality of reference grooves is equal to a number of the plurality of magnets, and the plurality of reference grooves areis disposed at regular intervals in the circumferential direction.

9. The rotor of claim 4, wherein each of the arms comprises a body and a tip portion, and each of the arms fixes each of the plurality of magnets such that the body is in contact with a side surface of a corresponding magnet of the plurality of magnets, and the tip portion formed at an end of a corresponding body is inserted into and coupled to a corresponding reference groove of the plurality of reference grooves so as to couple the protector to the rotor core.

\* \* \* \* \*